United States Patent [19]

Martin et al.

[11] Patent Number: 5,363,432
[45] Date of Patent: Nov. 8, 1994

[54] TRANSMISSION OF BROADBAND SIGNALS TO SUBSCRIBERS USING A TELECOMMUNICATIONS CABLE

[75] Inventors: Horst Martin, Iserlohn; Alfred Naab, St Augustin; Bernhard Hesse, Siegen; Wolfgang Weidhaas, Cologne; Gunther Quednau, Hagen; Dieter Fremgen, Wulfrath, all of Germany

[73] Assignees: Raynet GmbH, Germany; Philips Gloeilampenfabrieken, Netherlands

[21] Appl. No.: 855,020

[22] PCT Filed: Nov. 2, 1990

[86] PCT No.: PCT/GB90/01680
§ 371 Date: Jun. 1, 1992
§ 102(e) Date: Jun. 1, 1992

[87] PCT Pub. No.: WO91/07018
PCT Pub. Date: May 16, 1991

[30] Foreign Application Priority Data
Nov. 3, 1989 [GB] United Kingdom ............... 8924839

[51] Int. Cl.⁵ ........................................... H04M 11/00
[52] U.S. Cl. ........................................ 379/90; 379/93; 455/3.1
[58] Field of Search ............ 358/85; 379/53, 54, 379/90, 93, 96–99, 110; 455/3.1, 3.2, 5.1, 6.1–6.3, 7; 174/34, 36, 126.2; 370/123, 124; 348/14, 17

[56] References Cited

U.S. PATENT DOCUMENTS

| 4,054,910 | 10/1977 | Chou et al. | 358/86 |
| 4,135,202 | 1/1979 | Cutler . | |
| 4,485,400 | 11/1984 | Lemelson et al. | 358/85 |
| 4,578,702 | 3/1986 | Campbell, III . | |
| 4,648,682 | 3/1987 | Tubbs | 339/154 |
| 4,768,854 | 9/1988 | Campbell et al. . | |
| 4,860,343 | 8/1989 | Zetema, Jr. | 379/110 |
| 4,868,565 | 9/1989 | Mettes et al. | 174/36 |
| 4,885,747 | 12/1989 | Foglia | 370/123 |
| 4,891,694 | 1/1990 | Way . | |
| 5,010,399 | 4/1991 | Goodman et al. | 379/90 |
| 5,089,886 | 2/1992 | Grandmougin | 455/5.1 |

FOREIGN PATENT DOCUMENTS

| 0244260 | 11/1987 | European Pat. Off. . |
| 0352210 | 1/1990 | European Pat. Off. . |
| 1155470 | 6/1969 | United Kingdom . |
| 1272594 | 5/1972 | United Kingdom . |
| 8805979 | 8/1988 | WIPO . |

*Primary Examiner*—Wing F. Chan
*Attorney, Agent, or Firm*—Herbert G. Burkhard

[57] ABSTRACT

A method of transmitting a broadband electrical signal to a subscriber by means of a telecommunications cable, the telecommunications cable comprising at least one pair of electrical conductors surrounded by an electrical shield, which method comprises applying the broadband signal between (a) the shield and (b) at least one of the conductors of the pair.

14 Claims, 3 Drawing Sheets

TRANSMISSION OF BROADBAND SIGNALS TO SUBSCRIBERS USING A TELECOMMUNICATIONS CABLE

BACKGROUND OF THE INVENTION

The present invention relates to a method and devices for transmission of broadband electrical signals, for example data and/or video, to a subscriber, particularly a subscriber who has a pre-installed telephone cable. The invention can avoid the need for installation of further drop cables (generally coaxial cables), dedicated to the new data or video service.

As communications technology advances, subscribers are reguesting services in addition to simple telephone service. For example, there is a demand for video and data by cable which requires a high band width for transmission. In this specification any bandwidth greater than that for simple telephone operation (voice band, generally about 4 KHz alalogue amplitude modulated and 64 KHz digital) preferably greater than that for 2,3,4,5,10 or 20 combined public switched telephone signals is referred to as broadband, and includes but is not limited to data and video. In particular, we are concerned with RF, VHF, and UHF signals, preferably of frequency greater than 20, more preferably greater than 30, especially greater than 40 KHz analogue (AM) or greater than 200,300 or 400 KHz digital. In practice we are likely to be concerned with values greater than 30 or 40 MHz, particularly from 47–862 MHz. The invention may also be considered useful for signals having a bandwidth of at least 0.0001, 0.001 or 0.01 times that of NTSC format video.

For some years now broadband signals have been transmitted electrically by coaxial cable. In many installations part of the network is active, which means that amplifiers are provided every few kilometers, and part of the network, namely the drops to individual subscribers running from so-called splitter boxes, are passive. If cable television (CATV), for example, is to be supplied to a subscriber the public right of way and the subscribers garden have to be dug-up and a new, coaxial, line installed in the ground. This is of course very expensive.

We have now discovered that installation of a new cable can be avoided and ordinary telephone cables used instead, particularly pre-installed cables already serving the subscriber.

SUMMARY OF THE INVENTION

Thus, the invention provides a method of transmitting a broadband electrical signal (such as data or video and particularly RF, VHF or UHF signals) to a subscriber by means of a telecommunications cable, preferably a telephone cable particularly a drop cable, preferably a preinstalled cable, the telecommunications cable comprising at least one pair of electrical conductors surrounded by an electrical shield, which method comprises applying the broadband signal between (a) the shield and (b) at least one of the conductors of the pair. All of the conductors within the shield are preferably provided in pairs, preferably twisted pairs, and the cable preferably is not of the coaxial type.

This method will be particularly attractive where the telephone cable (or other telecommunications cable) is preinstalled and where it has surplus capacity, for example where a cable having at least two pairs of conductors supplies a subscriber who requires only a single telephone line. Telephone cables to subscribers (often called drop wires or drop cables) often contain 6,10,20 or 30 pairs of conductors and there will frequently be spare pairs not employed for the telephone service. In this case the telephone service and the broadband service can make use of different pairs.

The invention can, nonetheless, be used where this surplus capacity is not present. This can be done, for example, by transforming the telephone signal into a high frequency signal and multiplexing that signal with the new broadband signal, and transmitting the combined signal in the way defined above. The signals would then be separated at the subscriber's premises. An alternative would be to retain the telephone signal at voice band frequency and apply the broadband signal on top of it at higher frequency. Again, some means of separation would be provided at the subscriber's premises.

The precise way in which the broadband signal is applied to the cable may depend on the type of cable, its length, the network architecture and the signal transmitted etc. For example, it may be applied between (a) the shield and (b) both of the conductors of the pair. The cable may comprise at least two pairs of electrical conductors surrounded by a an electrical shield, and the signal applied between (a) the shield and at least one (preferably both) of the conductors of one of the pairs and (b) at least one (preferably both) of the conductors of another of the pairs. That configuration where both conductors of the pairs referred to are employed is preferred at least for drop cables having six pairs (such as those used by the German Bundespost), and for the preferred network systems described below. With such cables one or more additional pairs can be dedicated to transmission of a voice band signal, such a signal being applied between the conductors of a pair in the usual way. If desired, substantially all of the unused pairs may be connected to the shield and if additional telephone service is later required one or more of such pairs can be disconnected from the shield and used for telephone signals.

Some comments will now be made on a preferred broadband network, and a preferred telephone network with which it may be used. We are concerned preferably with the subscriber loop of a telephone network, also called the "local loop" or "last mile". In this part of the network a distribution cable, which may contain a few hundred pairs of conductors, runs generally along public roads etc, and branch joints are made at regular intervals at which drop wires or cables running to each subscriber are spliced into the distribution cable. These branch joints may be environmentally sealed by an enclosure known as a splice case, for example a heat-shrinkable article such as that supplied by Raychem to the German Bundespost under the Trade Mark VASM.

The present broadband signal is applied to the drop cable preferably at a position between the splice case at the distribution cable and the subscriber. It is preferably applied near the splice case such that the splice case and a further enclosure (which may also comprise a heat-shrinkable article) environmentally-sealing a splice to a cable applying the broadband signal may be contained within a single housing such as a pedestal or a manhole (which term includes a hand hole). In some cases, a cable applying the broadband signal may be spliced at the splice case between the distribution cable and the drop cable, and a single splice case may then be used.

The cable introducing the broadband signal (which may comprise a coaxial cable) is preferably spliced to the drop cable (or to the distribution cable or to its drop splice) by a method that during splicing maintains conductivity along at least one pair of conductors of the drop telephone cable, since in this way telephone service to the subscriber need not be interrupted during introduction of the new broadband service. A preferred way in which this may be done will be described below.

The broadband signal is preferably transmitted to the drop cable from an active network device that is only a short distance away, and that is preferably contained in the same pedestal, man-hole or other housing that contains the splice closures. That active device may comprise an amplifier and may comprise an electrical/optical convertor that generates the broadband electrical signal from an optical signal withdrawn from a waveguide such as an optical fibre. The active device may comprise means for adjusting the power of the broadband signal preferably according to an attenuation characteristic of the drop telephone cable. This ability to adjust the signal may be important since, in general, drop cables do not have the predetermined characteristics such as attenuation as a function of signal frequency or cable length that may be expected of a coaxial cable.

Such an active device may be provided one for each subscriber, in which case optimum performance may be obtained for each subscriber in spite of the varying lengths of drop cables (generally less than 100 m, preferably less than 50 m) from the positions where the signal is introduced to each subscriber.

The invention is particularly usefully used in conjunction on optical fibre distribution network that carries the broadband signal. That network may also carry the voice band telephone signal, the two different signals then being applied to the drop cable of an existing telephone network. The broadband and voice bands may be separated before application to the drop cable, and they may be separately applied as indicated above. Whilst installation of the new broadband system requires laying of the fibre cables generally along public rights of way, the cost and inconvenience of laying new drop cables into customers' premises is avoided. As an alternative, the optical fibre network may supply merely new services, such as data or video, and the existing telephone network continue to supply a telephone service.

We expect particularly good results when using the invention with an optical fibre distribution network of the following design. A single mode or multimode fibre bus runs from a telecommunications central office along a public right of way or other route adjacent many subscriber premises. The bus may carry multiplexed signals, allowing many or all of the subscribers to communicate independently. Subscriber interface units (SIUs) are provided regularly along the bus, a preferred number being 20–30 generally about 24 per bus. Each SIU is provided with one or more optical taps by means of which an optical signal is withdrawn from the bus. The taps are preferably non-invasive, and preferably comprise a means for bending the fibre and an optical coupler that may be applied to the bent portion of the fibre such that the optical signal is withdrawn through a buffer of the fibre at an intermediate position along its length. An elecrical/optical convertor is provided to convert the optical signal from the fibre into the broadband electrical signal that is applied to the drop cable. This tapping and detection is disclosed and claimed in U.S. Pat. No. 7,747,652, which is assigned to the same entity (Raychem) as the present application, the disclosure of which is incorporated herein by reference. The SIU may also provide power and it may have electronics that can identify, for example, packets of information received by means of an address code, and pass on only those intended for the subscriber or subscribers that it serves. Each SIU preferably serves 4–25, particularly about 8 subscribers, and the method of the invention therefore envisages transmission of one or more signals to a plurality of subscribers, with if desired, individual adjustments of signal power for each subscriber.

We prefer that an SIU be provided with means whereby a characteristic (especially power) of each signal it applies to respective drop cables be independently adjustable according to some characteristic (especially attenuation) of the respective drop cable.

An SIU preferably has an enclosure especially of butt design to protect the tap or taps and any electronics etc from the environment. The entering and leaving optical fibre cables may be sealed to the enclosure by a heat-shrinkable article, or the enclosure itself may be provided by a heat-shrinkable article. This enclosure is preferably contained within the same pedestal, man-hole or other housing referred to above.

Details of an optical fibre network employing non-invasive taps along a fibre bus are disclosed and claimed in U.S. Pat. No. 4,768,854, which is assigned to the same entity (Raychem) as the present application, the disclosure of which is incorporated herein by reference.

A preferred method and article will now be described by means of which the broadband signal may be applied to the telephone drop cable.

We prefer that an intermediate length of electrical shield of the telephone drop cable be removed, and an enclosure installed to bridge the resulting ends of the shield. The invention therefore also provides an enclosure for use in making an electrical connection to a cable at a portion between the ends of the cable, the cable comprising at least one pair of conductors surrounded by an electrical shield, the enclosure comprising:

(a) a hollow body of wraparound type;

(b) an inlet and outlet for the telecommunications cable, each of wrap-around type and each having an electrical contact means for the shield of the cable;

(c) electrical connection (which may be provided by the walls of the enclosure) between the electrical contact means; and (d) means for making connections between and/or to conductors of the telecommunications cable.

The enclosure may optionally include:

(e) an organizer for pairs of conductors of said telephone cable; and (f) means, such as attenuation coils, for shielding conductors of said telephone cable from the broadband signal as they pass through the enclosure.

In order that the enclosure be capable of being installed around the cable without totally severing the cable, the enclosure or part of it is preferably of "wrap-around" design. The term "wrap-around" is well understood in the cables accessories art (reference may be made for example to British Patent No. 455470, and as used herein it implies no particular shape nor flexibility, but rather the ability of installation around an elongate substrate (such as a cable) without access to an end thereof. Thus, the enclosure preferably has an inlet and outlet that are not permanently closed in cross-section, but instead are or may be opened out such that the cables may be laterally inserted therein. The enclosure may comprise two half-shells that are brought together around the cable. The half-shells may be hinged or otherwise fixed together to give the enclosure the configuration of a clam-shell. This wrap-around, halfshell or clam-shell design may be possessed by the entire enclosure or only part of it. For example the enclosure may comprise a substantially rectangular box, having a removable lid. Outlets and inlets may be provided at opposite edge faces (for an in-line design) or at a single edge face (for a butt design). The outlets/inlets may comprise extensions to the faces, or part of the outlets/inlets may be provided by the faces, and part by the lid, such that the closed cross-section of the outlets/inlets regain a closed cross-section when the lid is in place. Such an enclosure can be built around a cable without severing all of its conductors.

The inlets/outlets preferably have contact means, such as mechanical contacts, preferably resiliently biased, and especially in the form of leaf-springs, which make contact with the cable shield.

The enclosure may have an inlet and an outlet for the telephone cable, and a similar inlet for a coaxial cable carrying the broadband signal. The enclosure may therefore have some similarities to a conventional CATV splitter box. Its function will however be different, and some aspects of its structure will therefore be different. In particular its main inlet and outlet, whilst having contacts for an outer conductor, will not in general have a contact for a coaxial cable central conductor but will preferably have means for organizing and making connections to the pairs of conductors carried by a regular telephone cable.

The invention therefore provides a method and corresponding enclosure for making an electrical connection to a cable comprising at least one pair of conductors surrounded by an electrical shield, which comprises:

(a) removing the shield from a portion of cable between the ends of the cable and leaving unsevered at least one conductor of the cable (generally at least one pair of conductors that provide a telephone service, particularly a pre-existing telephone service);

(b) electrically connecting a conductor to at least one of the conductors of the pair at said portion (generally electrically connecting a broadband cable to the shield of said cable and to one or both of the conductors of the pair, preferably connecting the outer conductor of a coaxial cable directly or indirectly to both the shield and to both conductors of a pair and connecting the inner conductor of the coaxial cable to both conductors of another pair); and (c) installing around said portion an enclosure having an inlet and an outlet for said cable, the inlet and outlet being of wraparound type and having respective electrical contacts for the shield adjacent each edge of said portion and electrical connection between the electrical contacts preferably also contacting the inner conductor of said coaxial cable where used.

BRIEF DESCRIPTION OF THE DRAWINGS

The invention is further illustrated by reference to the accompanying drawings, in which.

DETAILED DESCRIPTION OF THE PREFERRED EMBODIMENTS

Figure 1:
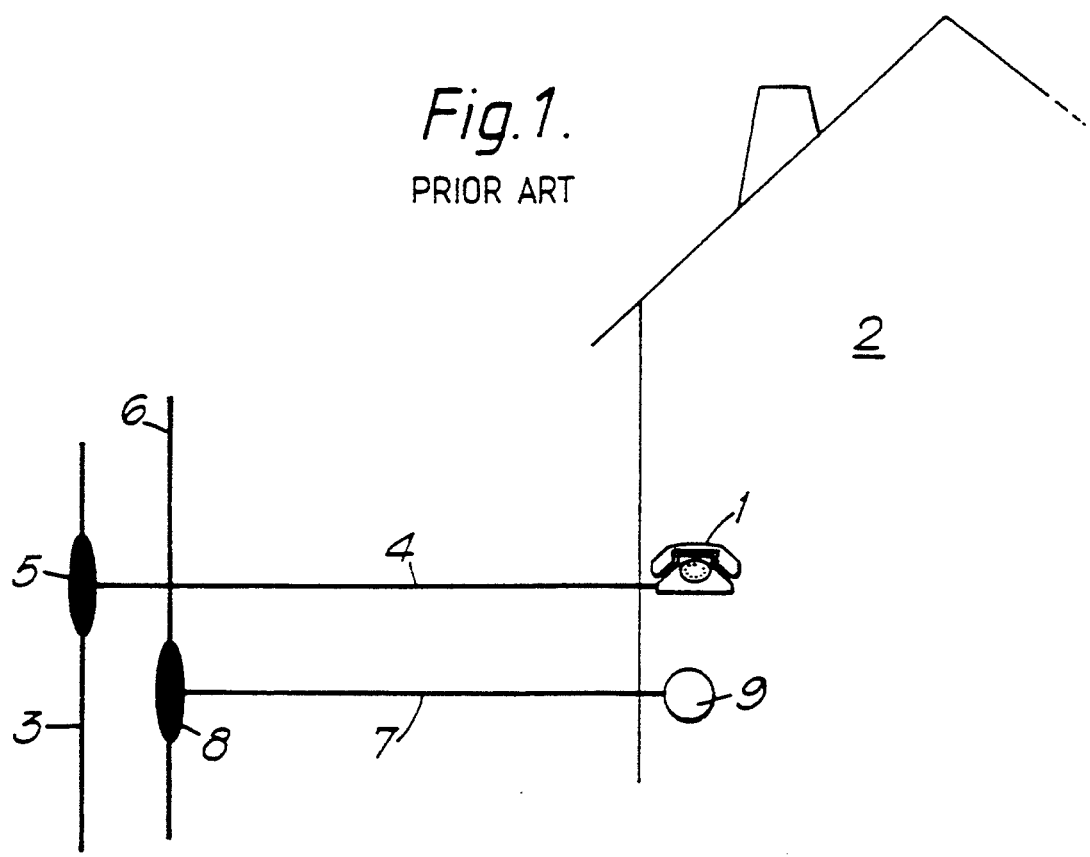
FIG. 1 shows an existing telephone and broadband network.

FIG. 1 shows a conventional way in which a telephone signal is transmitted to a telephone 1 or socket therefor at a subscriber's premises 2. A distribution cable 3 is spliced to a drop telephone cable 4, the splice being sealed by a splice case 5. A broadband coaxial cable 6 is also installed, having a drop coaxial cable 7 spliced at a passive splitter 8. The drop coaxial cable 7 also leads to the subscriber 2, and is terminated at a television or computer etc or a socket therefor. Where a broadband service has to be provided to a subscriber 1 a new line 7 has to be added which generally requires excavation since existing cable 4 is likely to be direct buried rather than ducted.

Figure 2:
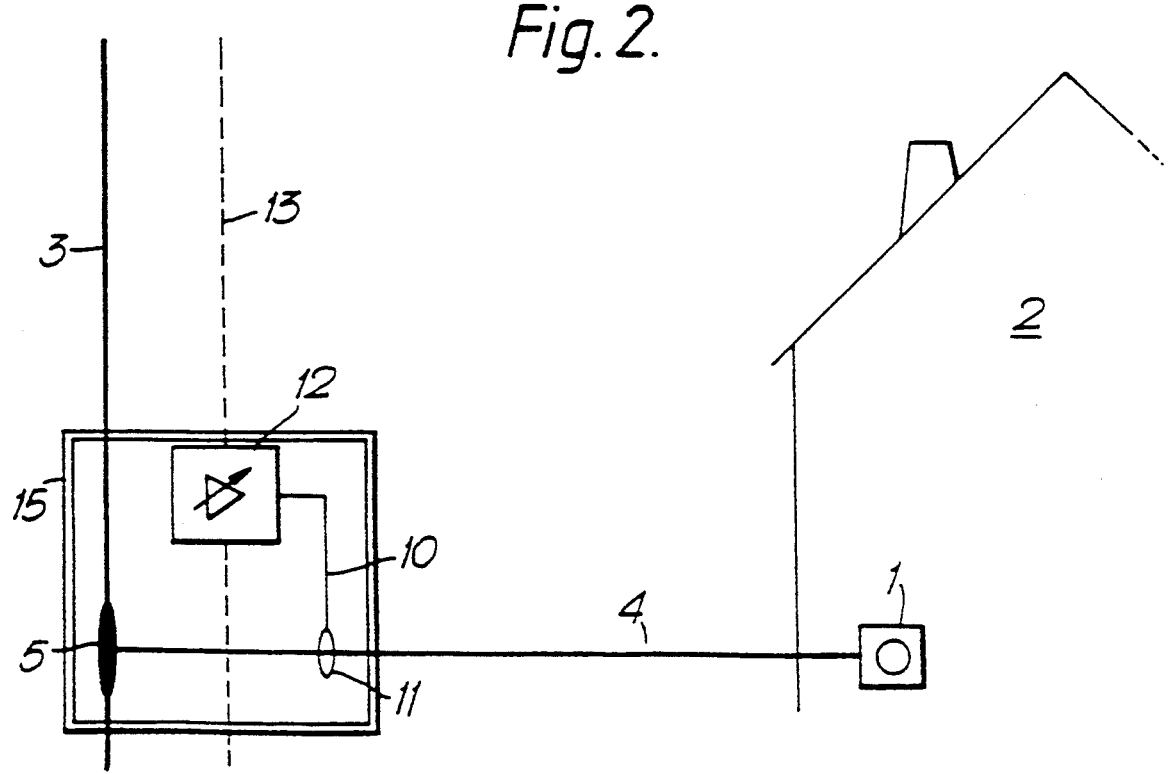
FIG. 2 shows a network employing the invention.

FIG. 2 illustrates the invention. A broadband signal is applied to the drop cable 4 by means of broadband cable 10 at a position 11 between the subscriber 2 and splice case 5.

The broadband signal transmitted in cable 10, which may comprise a coaxial cable, is preferably obtained from a dvice such as a subscriber interface unit (SIU) 12. The SIU 12 may have many functions, especially the withdrawal of an optical signal from an optical fibre bus 13, and its conversion to an electrical signal of the desired power. The desired power of the electrical signal will depend on a characteristic of the drop cable 4 particularly on its attenuation between position 11 and the subscriber 2.

The splice 5, the SIU 12 and an enclosure around a splice between cables 4 and 10 may all be sealed using heat-shrinkable articles and since they are preferably located close to one another they are preferably located in a single housing 15.

Figure 3A:
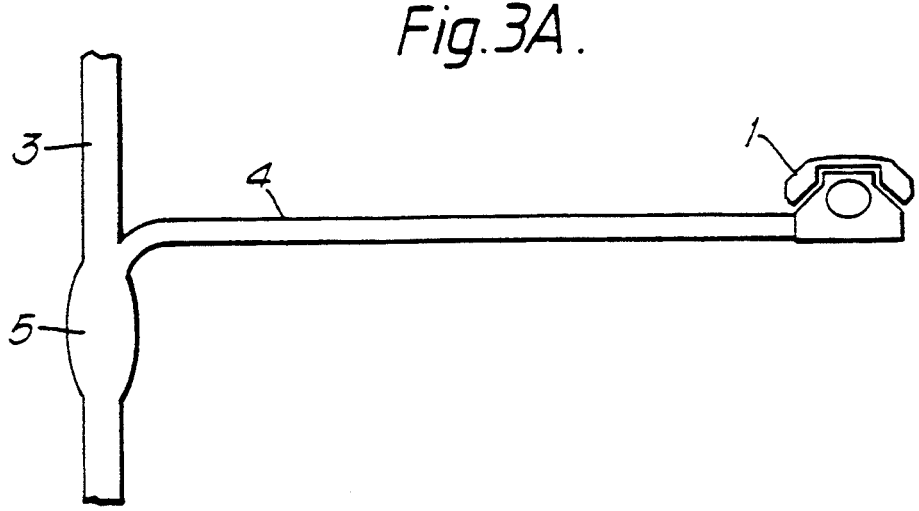
FIGS. 3A–C shows a method of making an electrical connection by means of the invention.
Figure 3B:
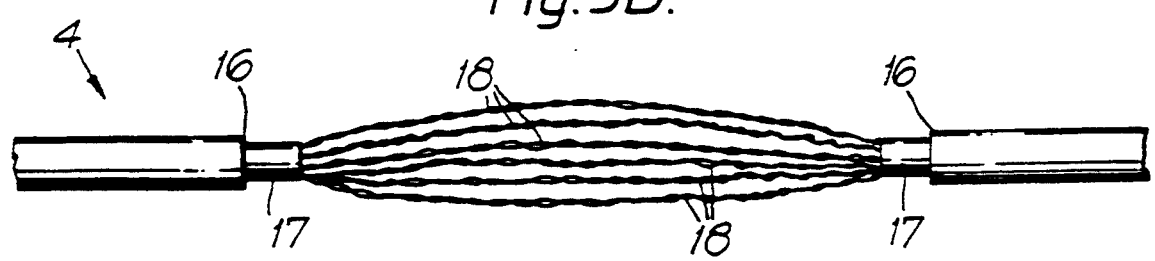
Figure 3C:
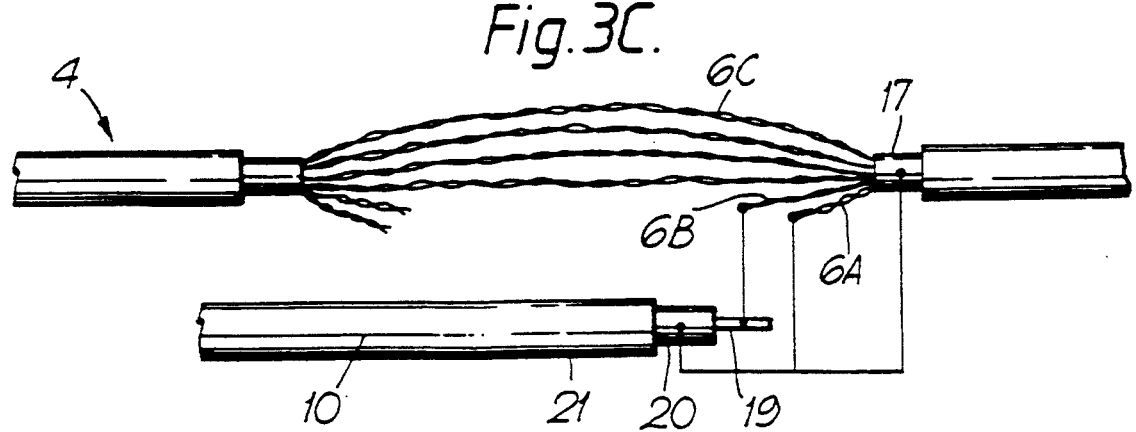

FIGS. 3A, 3B and 3C illustrate a way in which cable 10 may be joined to drop cable 4. A portion of cable jacket 16 is removed from between the ends of cable 4, and a shorter length of cable shield 17 is removed, leaving exposed cable shield at each end. This reveals twisted pairs of conductors 18. Cable 10 is then electrically connected to cable 4 such that a broadband signal carried by cable 10 is applied between (a) the shield 17 and the conductors of one pair 6A and (b) the conductors of another pair 6B. Other pairs, for example 6C remain for transmission of a telephone signal. In the embodiment illustrated the cable supplying the broadband signal is a coaxial cable 10 comprising a central conductor 19, and outer conductor 20 and a jacket 21.

The connection made in FIGS. 3A, 3B and 3C may be performed without disrupting the telephone service provided along twisted pair 6C. This may be done by building an enclosure around the drop cable 4 and, for example, plugging cable 10 into that enclosure. Such an enclosure may contain the various connections and any electronics necessary.

Figure 4A:
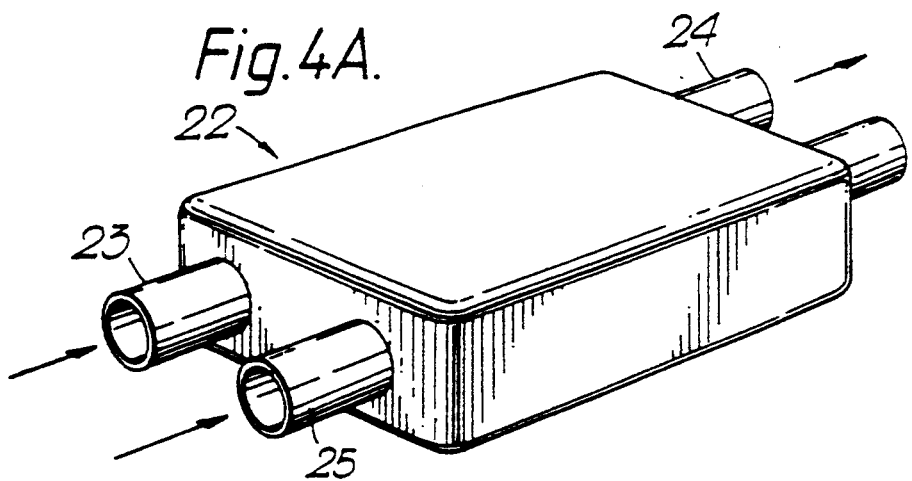
FIGS. 4A–B shows an enclosure according to the invention.
Figure 4B:
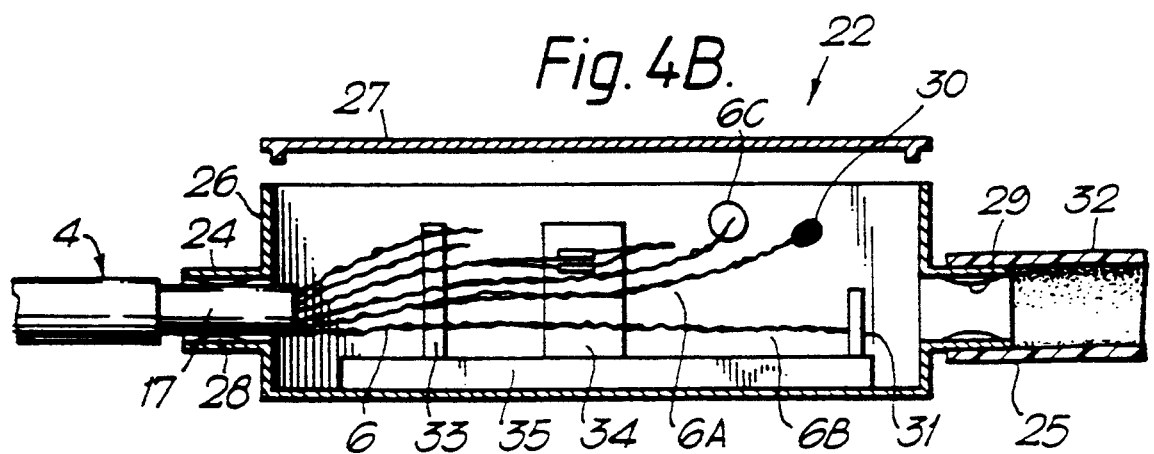

Such an enclosure 22 is illustrated in FIGS. 4A and 4B. The drop cable 4 may enter through inlet 23 and leave through outlet 24. The cable 10 supplying the broadband signal may enter through inlet 25.

FIG. 4B shows a partial section through an enclosure of the general type as that shown in FIG. 4A. The enclosure comprises a generally rectangular, hollow body 26 and lid 27. The outlet 24 makes electrical contact to shield 17 by means of contacts 28. The body 26 or other part of the enclosure may comprise a metal for shielding, and also for connecting contact 28 with contact 29. Contact 29 is provided in inlet 25 into which coaxial cable 10 (see FIG. 3C) may be plugged. Thus the shield of cable 10 is connected to the shield of cable 4. Also connected to the shield is pair 6A which is shown in FIG. 4B terminating to the wall of the body 26 at position 30. A centre conductor 19 of cable 10 (FIG. 3C) is connected to contact 31 when cable 10 is plugged into the enclosure 22. This causes centre conductor 19 to be connected to pair 6B. Pair 6C leaves the enclosure 22 out of view of the section illustrated.

The various cables entering and leaving enclosure 22 may be sealed to the inlets and outlets by means of heat-shrinkable sleeves 32 optionally internally-coated with a sealing material.

The enclosure is shown containing an organizer 33 for the pairs 6, and also a device 34 for splicing conductors if need be. An electronics board 35 may also be provided.

Figure 5:
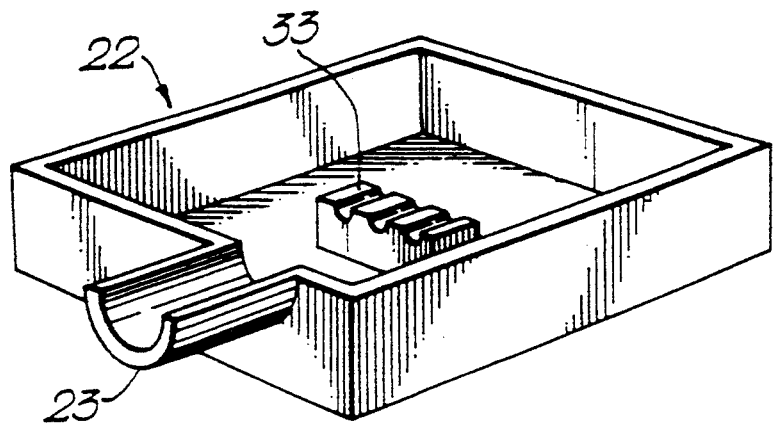
FIG. 5 shows a wraparound closure.

The enclosure 22 may be of the wrap-around design, half of which is shown incomplete in FIG. 5. The half-inlet 23 and organizer 33 may be seen. Two such half enclosures, and/or half-inlets/outlets and/or half organizers may be hinged together if desired.

For the avoidance of doubt it is here noted that the invention provides various methods and articles for supplying signals to subscribers, particularly through existing telephone cables. Any of the cables, connections, enclosures and/or network configurations may be selected.

We claim:

1. A method of transmitting a broadband electrical signal to a subscriber's premises by means of a telecommunications cable, the telecommunications cable comprising a first pair of electrical conductors surrounded by an electrical shield, comprising the steps of: applying the broadband signal between (a) the shield and (b) one of the conductors of the first pair.

2. A method according to claim 1 in which the telecommunications cable comprises a pre-installed cable connected to the subscriber's premises.

3. A method according to claim 1, in which the broadband signal is applied between (a) the shield and (b) both of the conductors of the first pair.

4. A method according to claim 1, in which the telecommunications cable further comprises a second pair of electrical conductors surrounded by the electrical shield, comprising the additional step of (d) transmitting a voice band signal between the conductors of the second pair.

5. A method according to claim 1, in which the telecommunications cable further comprises a second pair of electrical conductors surrounded by the electrical shield, comprising the additional step of applying the broadband signal between (c) the conductors of the second pair.

6. A method according to claim 4, in which the telecommunications cable further comprises at least four additional pairs of conductors surrounded by the electrical shield, comprising the additional step of (e) transmitting a voice band signal between the conductors of at least one of the additional pairs.

7. A method according to claim 1, in which said telecommunications cable runs from a distribution cable to the subscriber's premises, the broadband signal being applied to said telephone cable at a position where it joins the distribution cable.

8. A method according to claim 1, in which the telecommunication cable further comprises an additional pair of conductors surrounded by the electrical shield, and in which an electrical cable transmitting the broadband signal is spliced to said telecommunications cable by a method that maintains electrical conductivity along said additional pair of conductors of said telecommunications cable, such that said additional pair can transmit telephone signals continuously during the splicing.

9. A method according to claim 1, in which said telecommunications cable runs from a distribution cable to the subscriber's premises, the broadband signal being applied to said telecommunications cable at an intermediate position thereof, between the subscriber's premises and a position where said telecommunications cable joins the distribution cable.

10. A method according to claim 8, in which an enclosure is installed around said telecommunications cable at the position where the broadband signal is applied.

11. A method according to claim 10, in which an intermediate length of electrical shield of said telecommunications cable is removed, and in which the enclosure is installed to bridge the resulting ends of the shield, the enclosure having:

(1) an inlet for said telecommunications cable, which inlet has a first electrical contact for one resulting end of the shield.

(2) an outlet for said telephone cable, which outlet has a second electrical contact for the other resulting end of the shield, (3) electrical connection between the first and second contacts, and (4) means for making connections (i) between conductors of said first pair and conductors of other pairs of electrical conductors of said telecommunications cable.

12. A method according to claim 11, in which the enclosure additionally comprises:

(5) an organizer for pairs of conductors of said telecommunications cable.

13. A method according to claim 11, in which the enclosure additionally comprises:

(6) means for shielding conductors of said telecommunications cable from the broadband signal.

14. A method according to claim 1 in which said telecommunications cable is terminated at the subscriber's premises by means of a device having (a) a telephone socket;

(b) a socket for connection to a broadband signal receiver; and (c) means for shielding the socket (a) from the broadband signal.

* * * * *